Figure 1:
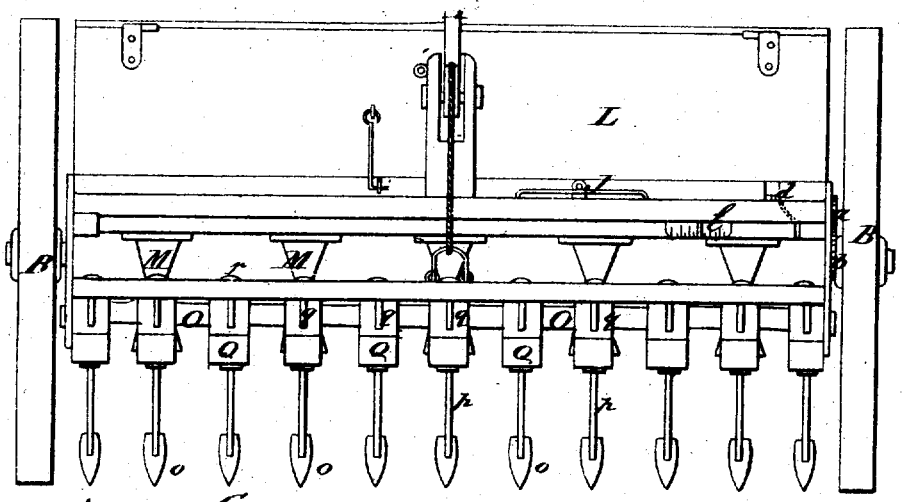

2 Sheets—Sheet 1.

W. A. VAN BRUNT, S. E. DAVIS, D. C. VAN BRUNT & R. S. BARBER.

Assignees by Mesne Assignments of G. W. Van Brunt.

SEEDING-MACHINES.

No. 7,839. Reissued Aug. 7, 1877.

Witnesses

Jos. B. Connolly

P. J. Boland

Inventors

W. A. Van Brunt, S. E. Davis

D. C. Van Brunt, R. S. Barber

By Connolly Bros Attorneys.

2 Sheets—Sheet 2.

W. A. VAN BRUNT, S. E. DAVIS, D. C. VAN BRUNT & R. S. BARBER.

Assignees by Mesne Assignments of G. W. Van Brunt.

SEEDING-MACHINES.

No. 7,839. Reissued Aug. 7, 1877.

Witnesses

Jos. B. Connolly

P. J. Boland

Inventor

W. A. Van Brunt, S. E. Davis

D. C. Van Brunt, R. S. Barber

By Connolly Bros Attorneys

UNITED STATES PATENT OFFICE.

WILLARD A. VAN BRUNT, S. E. DAVIS, R. S. BARBER, AND D. C. VAN BRUNT, OF HORICON, WISCONSIN, ASSIGNEES, BY MESNE ASSIGNMENTS, OF GEO. W. VAN BRUNT.

IMPROVEMENT IN SEEDING-MACHINES.

Specification forming part of Letters Patent No. 35,960, dated July 22, 1862; Reissue No. 3,339, dated March 23, 1869; Reissue No. 7,839, dated August 7, 1877; application filed March 15, 1877.

*To all whom it may concern:*

Be it known that GEORGE W. VAN BRUNT, of Horicon, in the county of Dodge and State of Wisconsin, did invent certain new and useful Improvements in Seeding-Machines; and we do hereby declare that the following is a full, clear, and exact description thereof, that will enable others skilled in the art to which it appertains to make and use the same, reference being had to the accompanying drawings, and to the letters of reference marked thereon, which form a part of this specification.

This invention has relation to that class of seeding-machines in which is employed a series of seed-cylinders, having radial flanges to effect the proper discharge of seed, and arranged to revolve upon a horizontal shaft, each cylinder being provided with a "cap" or cover, which confines the seed during its passage to the discharging-point.

The invention consists, firstly and broadly, in the construction of a broadcast-seeding device, with a flanged adjustable seeding cylinder or wheel, a cap or seed case, and an intervening space to prevent crushing of seed; secondly, in the construction of a seeding device, containing the features above stated, with an adjustable space to prevent crushing of seed and to govern its flow; thirdly, in providing a seeding device of the construction above stated with a gate or slide to govern the flow of seed; and, fourthly, in constructing a seeding device, which comprises a rotary feed wheel or cylinder and a seed case or cap, with the seed inlet and outlet on opposite sides, respectively, of the vertical diameter of said wheel or cylinder, to prevent the escape of seed when the cylinder is at rest.

To enable others skilled in the art to fully understand and use the invention, we will proceed to describe its construction and operation.

Referring to the accompanying drawings. A represents a rectangular frame, which is mounted on two wheels, B B, and has a box, C, placed on it, extending its whole width.

Within the box C there is placed a shaft, D, which has a pinion, *a*, fitted loosely on one end, and gearing into a wheel, *b*, attached concentrically to one of the wheels B.

The hub of the pinion protrudes through the box on its inner side, and on its inner end is provided with ratchet-teeth, which engage with corresponding teeth of a sliding sleeve, *c*, when the seeding device is in gear, said sleeve *c* being moved longitudinally on the shaft D to throw the seeding device in or out of gear by means of a lever, *d*.

On the shaft D there is secured a series of seed-wheels, E, which may be described as cylinders provided with radial flanges *f*, the spaces *g* between which form seed cells or pockets.

Figure 4:
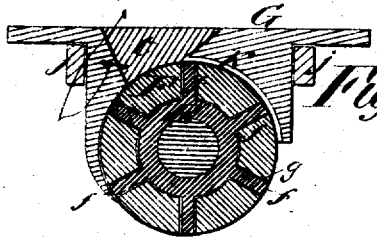
Figure 5:
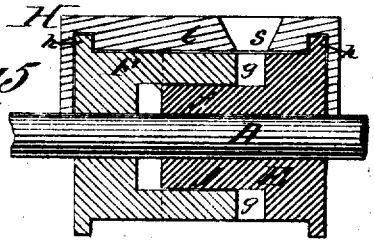

Each cylinder E has a shell or hollow cylinder, F, fitted on it. These shells or cylinders are slotted longitudinally to receive the flanges *f* of the cylinders E, the parts of the shells between the slots fitting snugly in the spaces *g* between the flanges *f* of the cylinders, as shown in Fig. 4.

Figure 8:
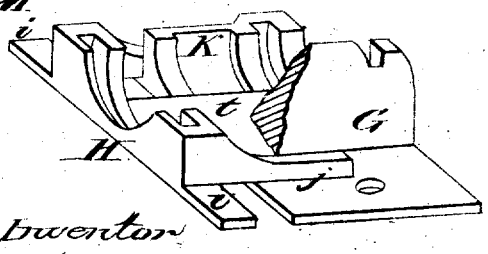
Figure 2:
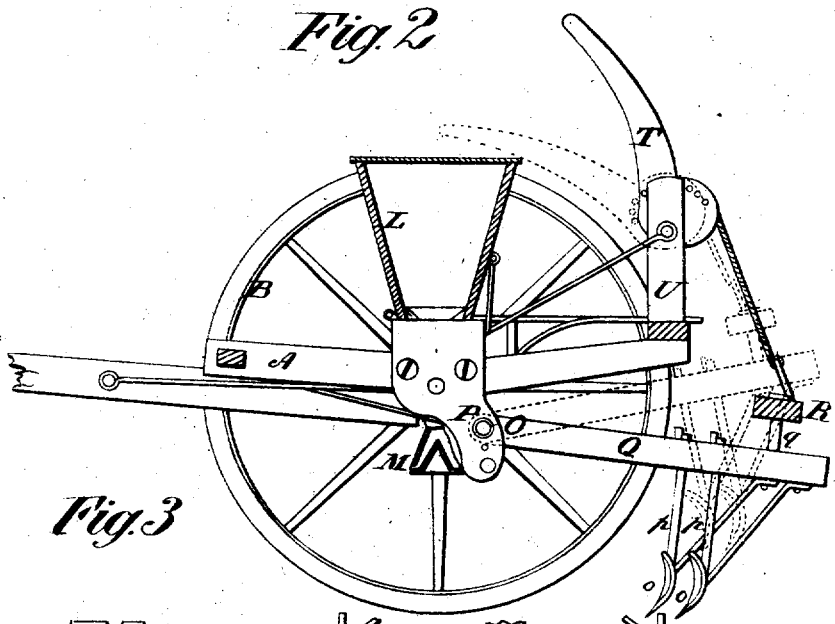
Figure 3:
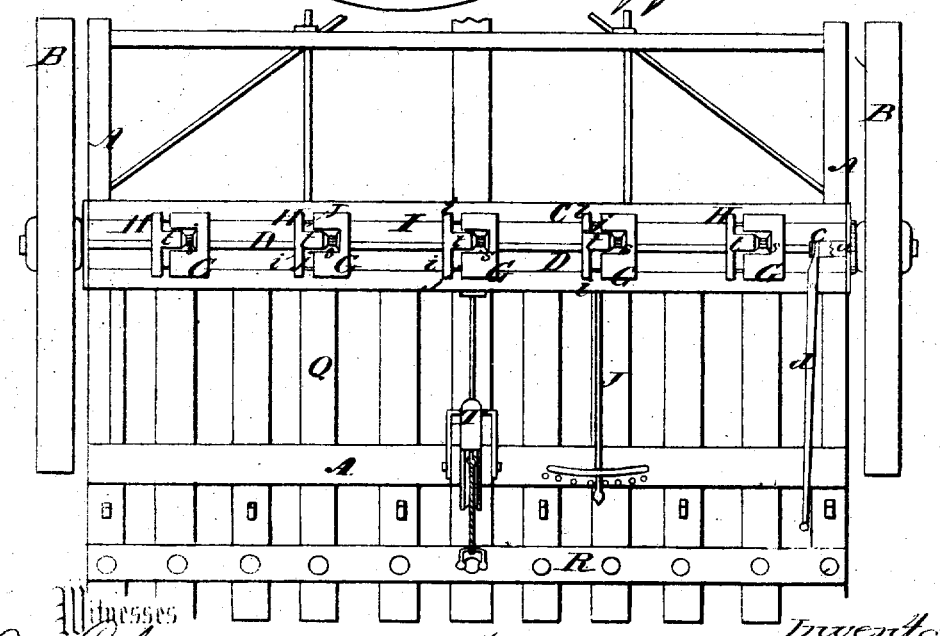

The shells or hollow cylinders F are each provided with a flange, *h*, at their outer ends, and these flanges are fitted to revolve in corresponding grooves in the under side of a cap which is formed in two parts, G H, fitted together with a tongue and groove. The part G, in which the groove *s* is formed, is secured to the box C, and the part H, on which the tongue *t* is formed, is fitted to slide longitudinally with the hollow cylinder F on the shaft D, and is supported in a proper position and guided in its movement by means of its flanges *i i* and laterally-projecting arms *j j*, (shown in Figs. 3 and 8), which latter embrace the two opposite sides of the fixed cap G. The groove *s* in the cap G is made in it, back of a line drawn perpendicularly through the center of its cylinders, and has downwardly-converging sides.

On the under side of the cap G, in front of the groove *s*, is a chambered recess, K. (Shown in Fig. 4.) This chambered recess is to prevent the possibility of any seed which may lodge on the tops of the radial flanges *f* of the cylinder from being crushed or bruised in passing under the cap and the groove or opening *s* through the cap, through which the seed passes from the hopper to the seed-cells of the cylinder E. The opening through the cap, being forward of a line drawn perpendicularly through the center of the cylinder, effectually prevents any tendency of the seed to run out through the chambered recess.

The flanges of the hollow cylinders F below the axle D run between two flanges of plates attached to a slide, I, which is moved or actuated by means of a lever, J, and by this movement of the slide the series of cylinders F may be moved to a greater or less distance on the cylinders E, and the capacity of the seed cells or pockets thereby varied, as circumstances may require, an index, *l*, (shown in Fig. 1,) extending rearwardly from the slide I indicating on a graduated plate the size of the seed-cells, and, consequently, the quantity of seed the machine is set to sow on a given area of ground.

Directly over the box C there is placed a seed box or hopper, L, the bottom of which is perforated immediately over the cylinders on shaft D.

Inside the hopper similar cavities or depressions are formed in the bottom immediately surrounding the perforations.

To the under side of the box C a series of pendent tubes, M, which may be described as two truncated hollow cones, united together at their small ends, is attached directly under the seed-cylinders.

Figure 6:
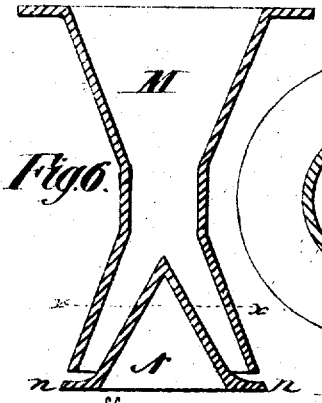
Figure 7:
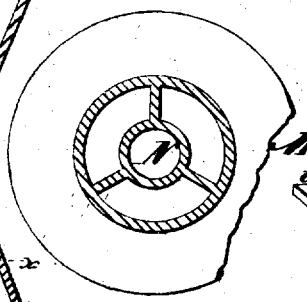

In the lower part of each tube there is a cone, N, preferably provided at its lower end with a circular flange, *n*. The cones N are smaller in diameter than the interior of the tubes M, and a space is consequently left between them for the discharge of seed. The cones are attached to the tubes by a web of cast-iron, the tube and cone being cast together. (Shown by a horizontal section in Fig. 6.)

The machine being thrown in gear and set in motion, the seed runs through the perforations in the bottom of the hopper, and fills the seed cells or pockets of the cylinders as they are successively brought under the openings.

The quantity of seed to be sown on a given surface or area of ground may be varied by adjusting the slide I, so that the shells or hollow cylinders F may be adjusted to a greater or less distance apart on the cylinders E, and the seed cells or pockets varied in capacity as required. The seed drops from the cells into the tubes M and falls on the cones N, and is discharged from the lower ends of the tubes in a scattering or broadcast state, the form or shape of the tubes in connection with the cones N and flanges *n* effecting such result.

O is a shaft, the ends of which are fitted in bearings in plates P, attached on each side of the frame, and on this shaft O there is placed loosely a series of drag-bars, Q, in the back end of which cultivator or harrow teeth *o* are attached by their standards *p*, which pass up through the bars, and are secured by tapering keys driven in behind them, and are braced by rods.

The bars Q are allowed to turn freely on the shaft O, and are kept at a proper distance apart by collars, which are placed on the shaft between the bars.

By changing the ends of the shaft O in the bearings or holes in the plate P, the bars are raised or lowered, and the pitch of the teeth accordingly varied, as may be desired.

The back end of each drag-bar Q has a pin, *q*, projecting at right angles from its surface, and these pins pass loosely through the cross-bar R, and have heads on their upper ends.

The bar R is connected by a cord or chain to an eccentric lever, T, fulcrumed in a standard, U, on the back part of the frame.

The pins *q* are of sufficient length to admit of each bar Q rising and falling to a certain extent independently of the others; and by means of the lever T the whole number of bars may be lifted simultaneously above the surface of the ground.

The teeth *o* harrow in the seed and pulverize the soil behind the tubes.

The principal characteristic improvement embodied in the devices described, it should be remembered, lies in the combination of a seeding-cylinder, with a recessed confining case, cap, or cover, the cylinder, in this instance, being adjustable, and means provided for varying the width of the recess to correspond to the adjustment of the cylinder.

Another important feature is the relative arrangement of the mouth and discharge openings of said case, cap, or cover, the same being on opposite sides of the perpendicular center of the cylinder, whereby the falling through of the seed is effectually prevented, it being necessary to lift the seed preparatory to its discharge.

We claim—

1. A seeding device for broadcast-seeding machines consisting, essentially, of a radially-flanged adjustable seed wheel or cylinder, and a seed case or cap, and having between the flanges of the one and the inner surface of the other a channel or space to prevent the crushing of seed.

2. A seeding device for broadcast-seeding machines consisting of a readially-flanged adjustable cylinder or seed-wheel and a seed case or cap, and having between the flanges of the one and the inner surface of the other an adjustable space or channel to pass seed without crushing.

3. A seeding device for broadcast-seeding machines consisting of a flanged adjustable seed wheel or cylinder and a seed case or cap, with a space or channel between to prevent crushing of seed, in combination with a gate or slide to govern the flow of seed, substantially as described.

4. A seeding device for broadcast-seeding machines comprising a rotary cylinder or feed-wheel and a seed case or cap, having on opposite sides of the vertical diameter of the cylinder the seed inlet and outlet, respectively, for the purpose set forth.

In testimony that we claim the foregoing we have hereunto set our hands this 9th day of February, 1877.

W. A. VAN BRUNT.
S. E. DAVIS.
R. S. BARBER.
D. C. VAN BRUNT.

Witnesses:
CHARLES ALLEN,
C. L. BUTTERFIELD.